United States Patent
Miyasaka et al.

(10) Patent No.: US 8,448,681 B2
(45) Date of Patent: May 28, 2013

(54) PNEUMATIC TIRE

(75) Inventors: Atsushi Miyasaka, Kodaira (JP); Yasuo Himuro, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 461 days.

(21) Appl. No.: 12/671,402

(22) PCT Filed: Jul. 30, 2008

(86) PCT No.: PCT/JP2008/063693
§ 371 (c)(1),
(2), (4) Date: Mar. 22, 2010

(87) PCT Pub. No.: WO2009/017166
PCT Pub. Date: Feb. 5, 2009

(65) Prior Publication Data
US 2010/0193101 A1     Aug. 5, 2010

(30) Foreign Application Priority Data
Jul. 30, 2007    (JP) .................................. 2007-198188

(51) Int. Cl.
*B60C 13/00* (2006.01)
*B60C 13/02* (2006.01)
*B60C 15/00* (2006.01)

(52) U.S. Cl.
USPC ............ 152/523; 152/450; 152/539; 152/555

(58) Field of Classification Search
None
See application file for complete search history.

(56) References Cited

U.S. PATENT DOCUMENTS
2009/0032161 A1    2/2009   Yamaguchi

FOREIGN PATENT DOCUMENTS

| | | |
|---|---|---|
| DE | 10 2005 018 155 A1 | 10/2006 |
| EP | 1 857 299 A1 | 11/2007 |
| JP | 10-34766 A | 2/1998 |
| JP | 2001-171318 A | 6/2001 |
| JP | 2006-168499 * | 6/2006 |
| WO | 2006/077973 A1 | 7/2006 |
| WO | 2007/032405 A1 | 3/2007 |

OTHER PUBLICATIONS

Machine translation of JP 2006-168499, 2006.*
European Search Report issued in European Application No. 08791924.7 dated Apr. 27, 2011.
International Search Report PCT/JP2008/063693, Oct. 28, 2008, 4 pages.

* cited by examiner

*Primary Examiner* — Justin Fischer
(74) *Attorney, Agent, or Firm* — Sughrue Mion, PLLC

(57) ABSTRACT

A pneumatic tire 1 according to the present invention includes a plurality of turbulence generation ridges 13 which extend on a surface of a tire side portion 7 in a tire-radial direction and which are arranged at a pitch in a tire-circumferential direction. A protrusion 15 rising from the surface 7a of the tire side portion 7 is formed in the tire side portion 7. Either an inner end portion 13A of the turbulence generation ridge 13 or an outer end portion 13B of turbulence generation ridge 13 is smoothly continuous to a surface of the protrusion 15. An inner end height (H1), which is a height of the inner end portion 13A from the surface 7a of the tire side portion 7, is larger than an outer end height (H2), which is a height of the outer end portion 13B from the surface 7a of the tire side portion 7.

5 Claims, 14 Drawing Sheets

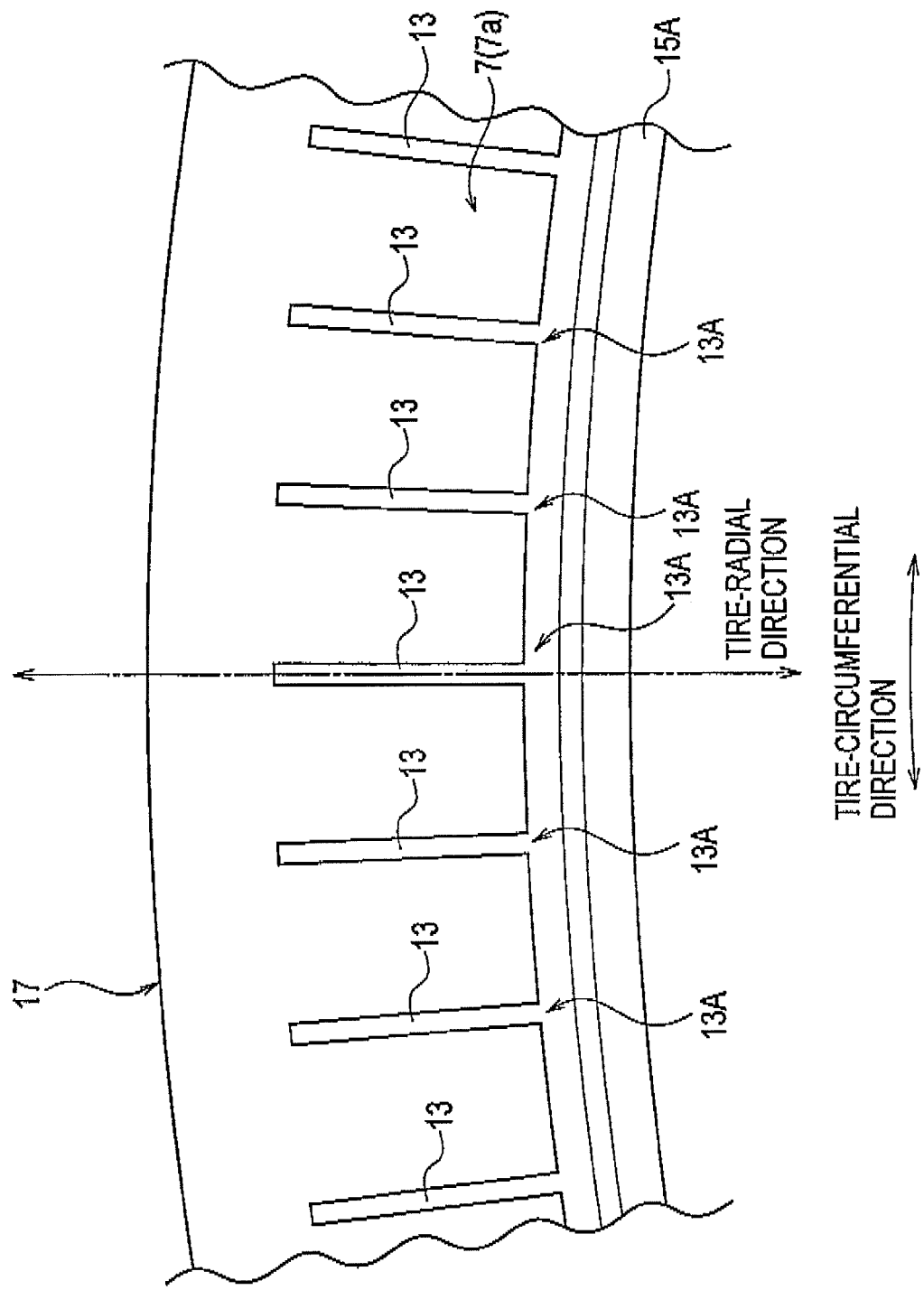

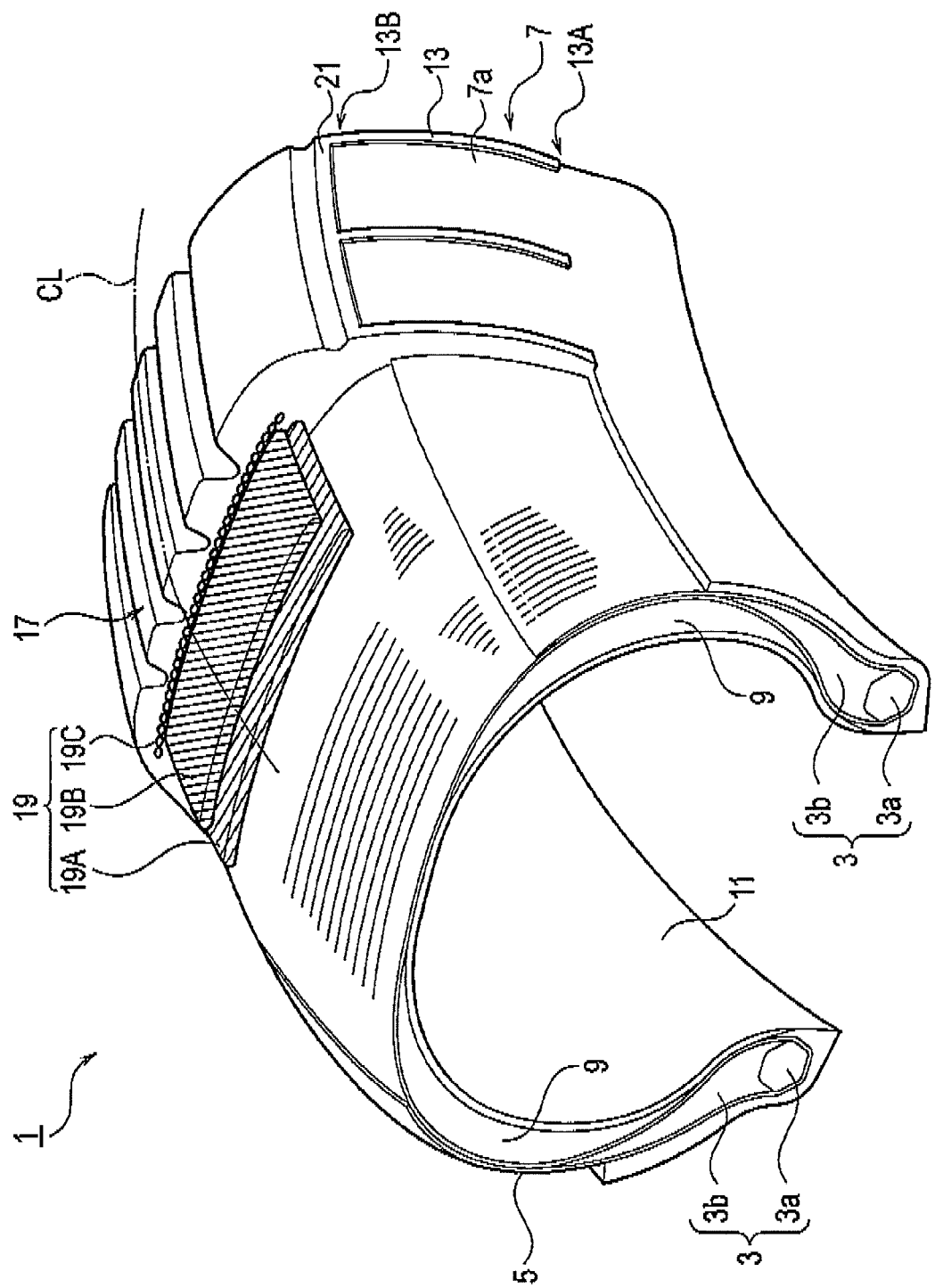

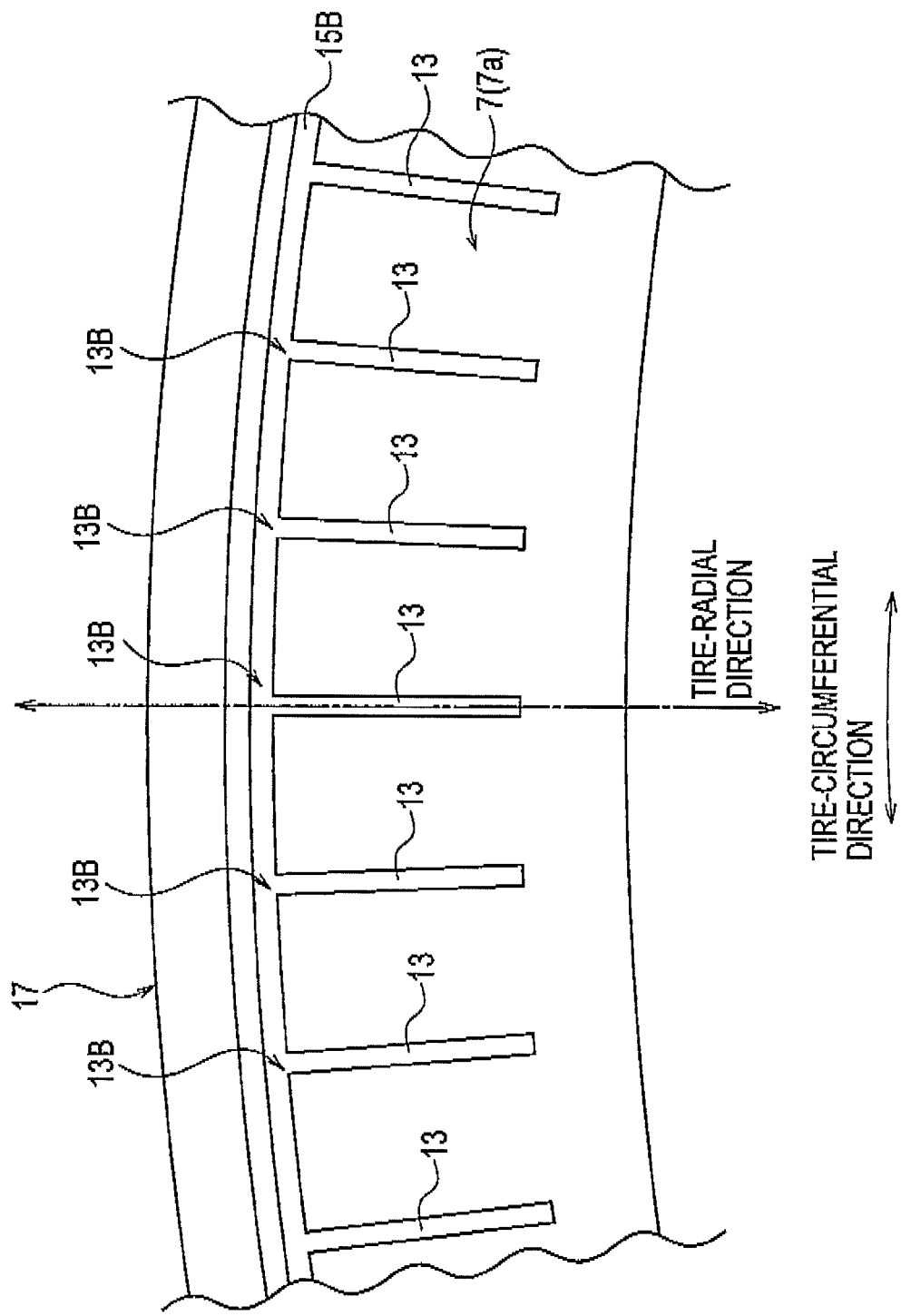

PNEUMATIC TIRE

CROSS REFERENCE TO RELATED APPLICATIONS

This application is a National Stage of International Application No. PCT/JP2008/063693 filed Jul. 30, 2008, claiming priority based on Japanese Patent Application No. 2007-198188, filed Jul. 30, 2007, the contents of all of which are incorporated herein by reference in their entirety.

TECHNICAL FIELD

The invention relates to a pneumatic tire, and, in particular, to a pneumatic tire that has plural turbulence generation ridges extending on a surface of a tire side portion in the radial direction of the tire and arranged at a pitch in the circumferential direction of the tire.

BACKGROUND ART

Generally, rise in temperature of a pneumatic tire is not favorable in view of the durability because the temperature rise accelerates over-time changes such as the changes in the properties of a material for the pneumatic tire or causes a break of a tread thereof during a high speed run. Lowering the temperature of the tire has been a significant desideratum to improve the durability especially for a run-flat tire in a case where a passenger vehicle with the run-flat tire is running while the run-flat tire is punctured (running with a 0-kPa internal pressure). For example, if a run-flat tire that has a crescent-shaped reinforcement rubber of a crescent shaped cross section taken in a tread width direction is running while being punctured, deformation in radial direction concentrates on the reinforcement rubber. This raises the temperature of this portion to a very high temperature, thereby affecting significantly the durability.

In an example of such new means for lowering tire temperature (see WO 2007/032405), the cooling effect is improved by forming turbulence generation ridges extending in the radial direction of the tire in tire side portions and by causing the turbulence generation ridges to generate or accelerate turbulence on the surface of the tire. Rubber, which tires are made of, is a material of poor heat conductivity. So, it is a known fact that the cooling effect by accelerating the turbulence generation is more effective than the cooling effect by expanding the heat-dissipating area.

In a conventional pneumatic tire having turbulence generation ridges formed therein, however, the turbulence generation ridges are formed so as to protrude from the tire side portions and are thus exposed outside. Therefore, if coming into contact with something (e.g., a curb), the tire side portions, i.e., the turbulence generation ridges may be damaged, e.g., chipped or torn away. The exposed turbulence generation ridges formed so as to protrude from the tire side portions are more likely to have defective shape or appearances for the following reason. When the exposed turbulence generation ridges are formed in the mold, bare defects are more likely to occur especially in an inner end portion on the innermost side, in the tire-radial direction, of each turbulence generation ridge, and in an outer end portion on the outermost side, in the tire-radial direction, of each turbulence generation ridge.

In addition, while a vehicle is negotiating a sharp curve and a large lateral force is acting on pneumatic tires, the outer end portions (i.e., the end portions closer to the tread portion) located on a surface of the tire come into contact with the road surface, the surface facing outward when the tire is fitted to the vehicle. Such a contact leads to an inconvenience that the tire may be damaged in the outer end portions. A countermeasure to address such inconvenience is leaving the outer-side portion, in the tire-radial direction, of each tire side portion without any turbulence generation ridges formed therein. Such a measure, however, leads to another problem that temperature cooling effect of the turbulence generation ridges is lowered.

Accordingly, an object of the invention is providing a pneumatic tire capable of reducing the possibility of defects in shape and appearances during the manufacture, capable of reducing damages on turbulence generation ridges while a vehicle is running, and capable of enhancing the cooling effect on the temperature of the tire side portions.

DISCLOSURE OF THE INVENTION

The inventors have worked hard focusing on the above-mentioned problem, and have found the following fact. If either at least one of the inner end portion of each turbulence generation ridge and the outer end portion of the turbulence generation ridge is formed so as to be smoothly continuous to the surface of a protrusion, the turbulence generation ridges will never be broken even by side contact. In addition, higher cooling effect can be obtained.

Accordingly, the invention has the following aspect. Firstly, the invention according to a first aspect of the invention is summarized as a pneumatic tire (a pneumatic tire 1) including a plurality of turbulence generation ridges (turbulence generation ridges 13) which extend on a surface of a tire side portion (a surface 7a of a tire side portion 7) in a tire-radial direction and which are arranged at a pitch in a tire-circumferential direction, wherein a protrusion (a protrusion 15) rising from the surface of the tire side portion is formed in the tire side portion, at least one of an inner end portion (an inner end portion 13A) located on the innermost side, in the tire-radial direction, of each turbulence generation ridge and an outer end portion (an outer end portion 13B) located on the outermost side, in the tire-radial direction, of each turbulence generation ridge is smoothly continuous to a surface of the protrusion, and an inner end height (H1), which is a height of the inner end portion from the surface of the tire side portion, is larger than an outer end height (H2), which is a height of the outer end portion from the surface of the tire side portion.

According to the aspect, at least one of the inner end portion and the outer end portion is smoothly continuous to the surface of the protrusion. Accordingly, the turbulence generation ridges do not protrude from the corresponding tire side portions, and are thus not exposed outside. For this reason, the occurrence of bare during the manufacture can be reduced, and thereby the occurrence of defects in shape and in appearances can be made less likely.

In addition, if one of the turbulence generation ridges comes into contact with something (e.g., a curb), the magnitude of the stress acting on the base portion (bottom portion) of the turbulence generation ridge, which may otherwise break the turbulence generation ridge from the base portion can be reduced, so that the stiffness of the inner end portion or of the outer end portion can be enhanced. Accordingly, the turbulence generation ridges can be prevented from being damaged, e.g., chipped or torn away, while the vehicle is running.

Incidentally, the centrifugal force caused by the rotation of the pneumatic tire and by the travelling of the vehicle makes the air flow from the inner side in the tire-radial direction towards the outer side in the tire-radial direction. As the inner end height (H1) is larger than the outer end height (H2), the above-described air, that is, the air that goes over and beyond the turbulence generation ridges can accelerate. The accelerated air can also enhance the cooling effect on the temperatures of the tire side portions.

Another aspect of the invention is summarized in that the protrusion is any one of an inner-side restriction member (a rim guard 15A) and an outer-side restriction member (a protector 15B), the inner-side restriction member being formed at the outer side, in a tread-width direction, of a bead portion located at the inner side in the tire-radial direction within the tire side portion, the inner-side restriction member preventing the inner end portion from being damaged, the outer-side restriction member being formed in a tread-shoulder portion and preventing the outer end portion from being damaged.

Still another aspect of the invention is summarized in that the turbulence generation ridges are formed at any one of a tire maximum width position in a tread-width-direction section and a position located at the outer side, in the tire-radial direction, of a bead filler.

Further still another aspect of the invention is summarized in that wherein relationships $1.0 \leq p/h \leq 50.0$ and $1.0 \leq (p-w)/w \leq 100.0$ are satisfied where "h" is a ridge height, which is a height from the surface of the tire side portion to a protruding position located in the center of each turbulence generation ridge in a longitudinal direction of the turbulence generation ridge, each turbulence generation ridge protruding most at the protruding position, "w" is a ridge width, which is a width extending substantially orthogonal to the longitudinal direction of the turbulence generation ridge, and "p" is a pitch between each adjacent two of the turbulence generation ridges.

Even further still another aspect of the invention is summarized in that a side reinforcement layer (a side reinforcement layer 9) is further included, the side reinforcement layer having a crescent-like shape in a tread-width-direction section and which is configured to reinforce the tire side portion.

BRIEF DESCRIPTION OF THE DRAWINGS

FIG. 9 is a side-elevation view illustrating a part of turbulence generation ridges according to Embodiment 2.

FIG. 10 is a partially-sectional perspective view illustrating a pneumatic tire according to Embodiment 3.

FIG. 11 is a side-elevation view illustrating a part of turbulence generation ridges according to Embodiment 3.

BEST MODES FOR CARRYING OUT THE INVENTION

Figure 1:
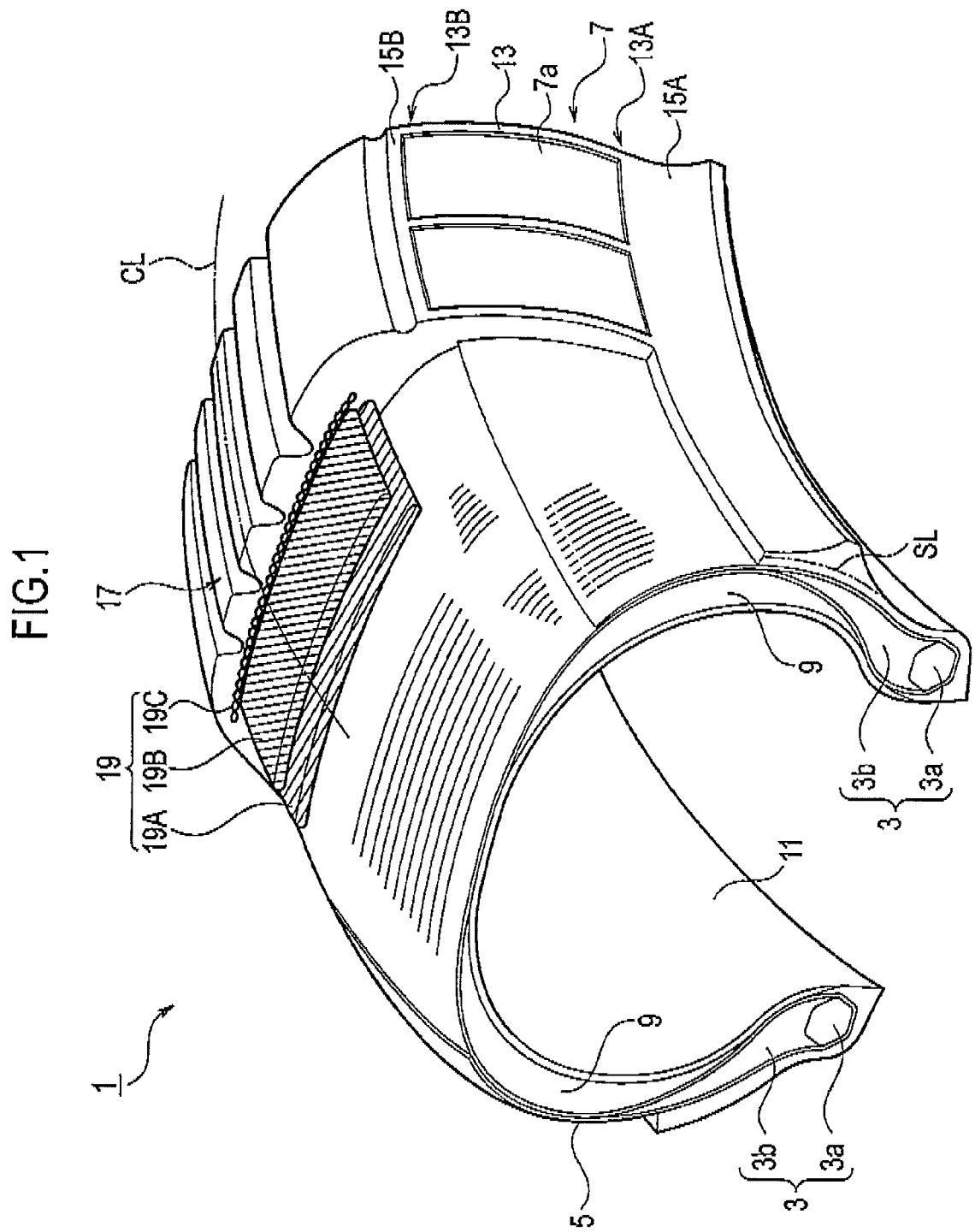
FIG. 1 is a partially-sectional perspective view illustrating a pneumatic tire according to Embodiment 1.

An example pneumatic tire of the invention will be described below by referring to the drawings. In the description of the drawings below, the same or similar reference numerals represent the same or similar portions. The drawings are schematic ones, so it has to be noted that the proportions of dimensions or the like differ from the actual ones. Specific dimensions should be judged by taking account of the descriptions given below. In addition, relative dimensions and proportions may vary among various drawings.

Embodiment 1

Configuration of Pneumatic Tire

Figure 2:
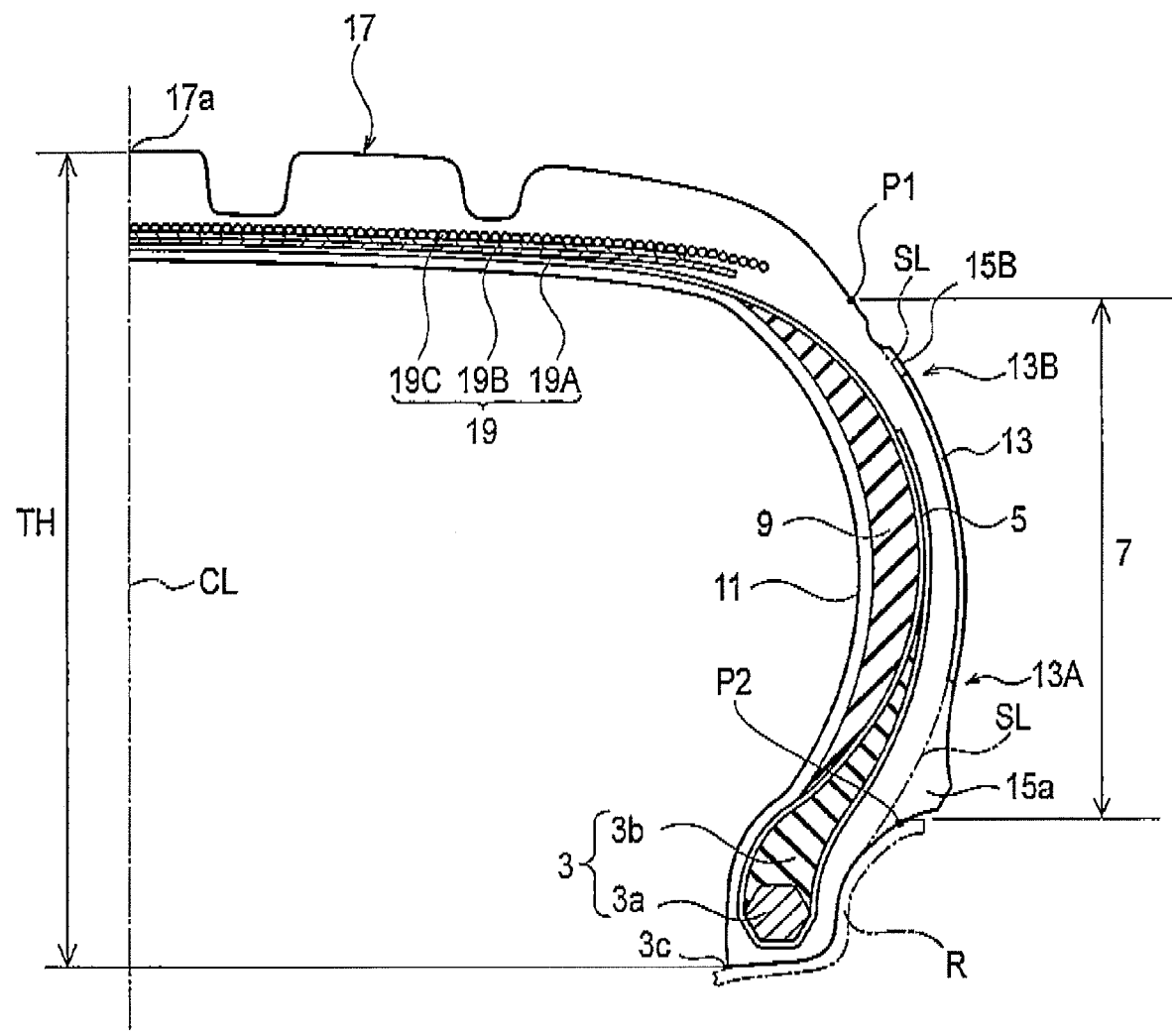
FIG. 2 is a view illustrating a tread-width-direction section of the pneumatic tire according to Embodiment 1.
Figure 3:
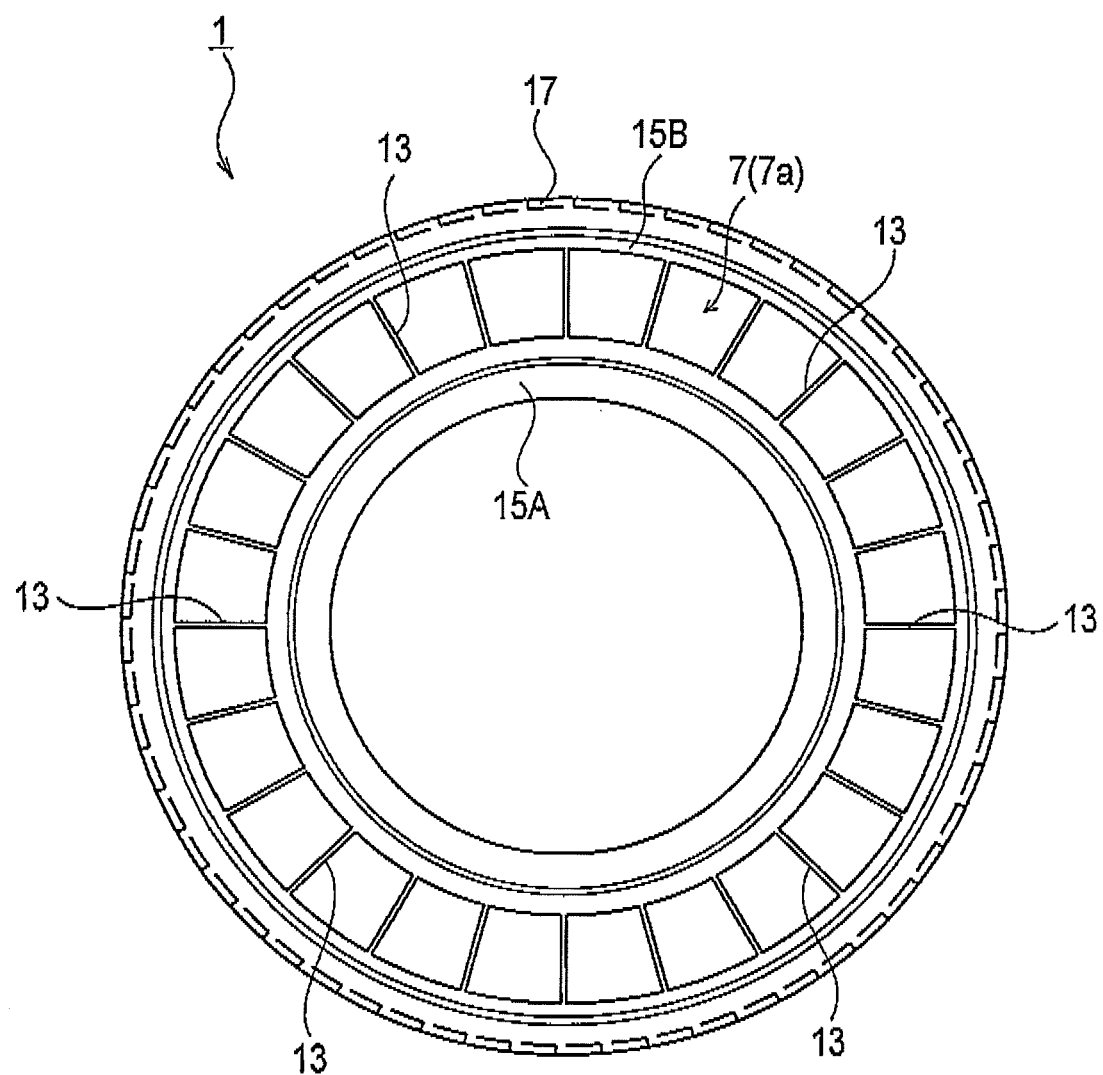
FIG. 3 is a side-elevation view illustrating the pneumatic tire according to Embodiment 1.

Firstly, the configuration of a pneumatic tire according to Embodiment 1 will be described by referring to FIGS. 1 to 3. FIG. 1 is a partially-sectional perspective view illustrating the pneumatic tire according to Embodiment 1. FIG. 2 is a cross section of the pneumatic tire according to Embodiment 1 taken in a tread-width-direction. FIG. 3 is a side-elevation view illustrating the pneumatic tire according to Embodiment 1.

As FIGS. 1 to 3 show, a pneumatic tire 1 includes a pair of bead portions 3 and a carcass layer 5. Each of the bead portions 3 at least includes a bead core 3a and a bead filler 3b. The carcass layer 5 is turned up at the bead core 3a.

Side-reinforcement layers 9 are formed on the inner side of the carcass layer 5 in order to reinforce tire side portions 7. Each of the side-reinforcement layers 9 is made of a rubber stock having a crescent-like shape in a tire-width-direction section.

Each of the tire side portions 7 lies in a range between a position P1 and a contact outer end P2. Specifically, a tire height TH is defined as a distance, under the proper internal pressure condition, between a tread outermost position 17a and a bead inner end 3c that is a point of the bead portion 3 positioned at the innermost side in the tire-radial direction. Here, the position P1 is defined as a position away from the bead inner end 3c by 90% of the tire height TH. The contact outer end P2 is defined as the outermost point, in the tire-radial direction, of all the points where the bead section 3 and a rim R are in contact with each other.

An inner liner 11 is formed on the inner sides, in the tread-width direction, of the side-reinforcement layers 9. The inner liner 11 corresponds to a tube and is a rubber layer of high air tightness.

Plural turbulence generation ridges 13 are formed on the outer sides, in the tread-width direction, of the carcass layer 5, that is, on surfaces 7a of the tire side portions 7. Each of the turbulence generation ridges 13 extends in the tire-radial direction, and the plural turbulence generation ridges 13 are arranged in the tire-circumferential direction so as to be separated from one another at a pitch (i.e., equidistantly arranged). The turbulence generation ridges 13 are configured to generate or accelerate turbulence, and the details of the turbulence generation ridges 13 will be described later.

Ridges 15 rising from the surfaces 7a of the tire side portions 7 are formed on the end portions of the turbulence generation ridges 13 (of the tire side sections 7).

The ridges 15 include rim guards 15A (inner-side restriction members) and protectors 15B (outer-side restriction members). Each of the rim guards 15A is formed at the outer side, in the tread-width direction, of the corresponding bead portion 3 positioned on the inner side, in the tire-radial direction, within the corresponding tire side portion 7. Each of the protectors 15B is formed on the corresponding tread-shoulder portion. The rim guards 15A are configured to prevent the inner end portions 13A from being damaged whereas the protectors 15B are configured to prevent the outer end portions 13B from being damaged.

A tread portion 17 configured to come into contact with the road surface is formed on the outer side, in the tire-radial direction, of the carcass layer 5. Belt plies 19 are formed between the carcass layer 5 and the tread portion 17. The belt plies 19 include a first belt ply 19A, a second belt ply 19B, and a circumferential-direction belt ply 19C. Each of the first belt ply 19A and the second belt ply 19B has its cords arranged diagonally with respect to the tire-circumferential direction. The circumferential-direction belt ply has its cords arranged substantially in parallel with the tire-circumferential direction.

<Configuration of Turbulence Generation Ridge>

Figure 4:
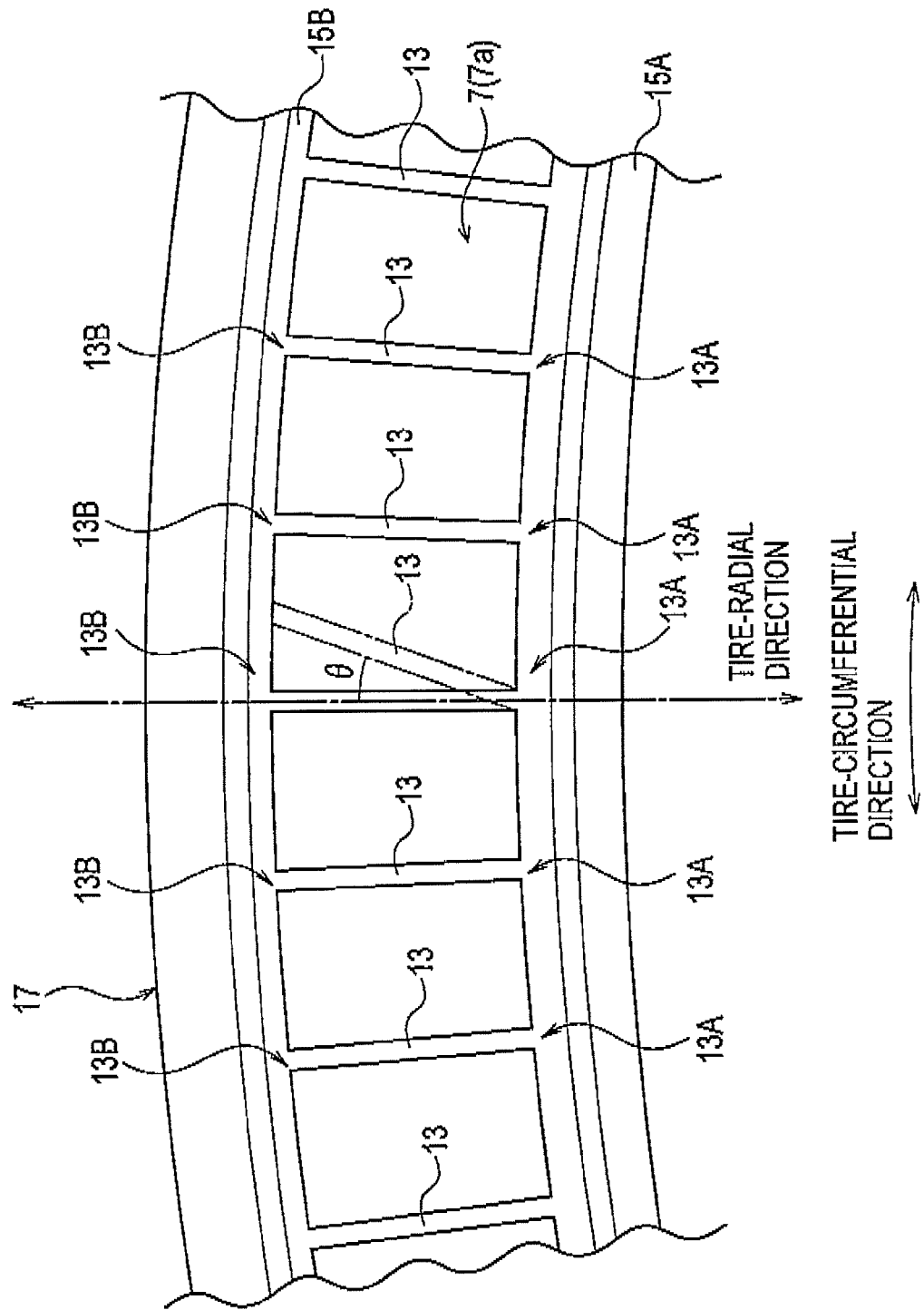
FIG. 4 is a side-elevation view illustrating a part of turbulence generation ridges according to Embodiment 1.
Figure 5:
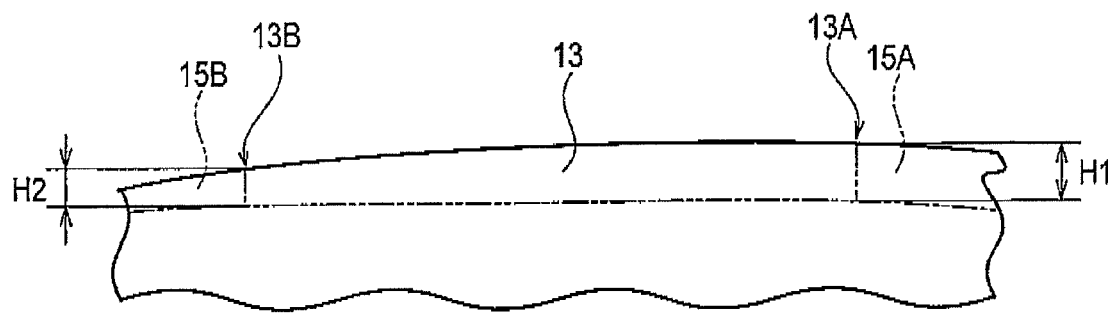
FIG. 5 is a diagram describing one of the turbulence generation ridges according to Embodiment 1.
Figure 6:
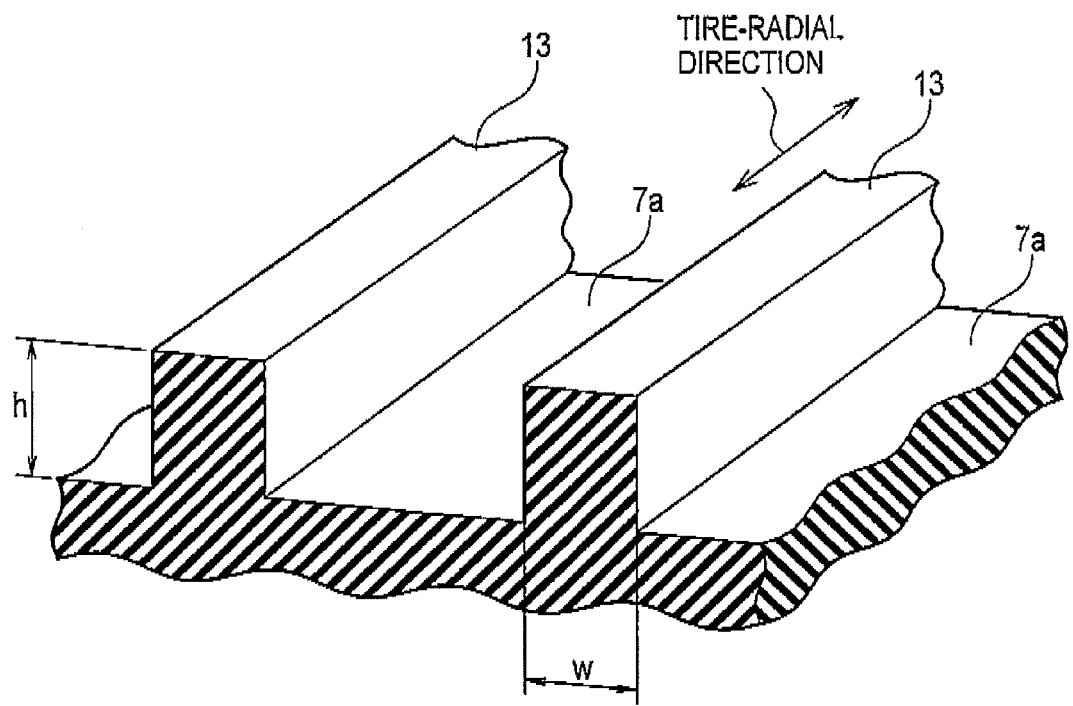
FIG. 6 is a perspective view illustrating the turbulence generation ridges according to Embodiment 1.

The configuration of each of the above-mentioned turbulence generation ridges 13 will be described below by referring to FIGS. 1 to 5. FIG. 4 is a side-elevation view illustrating a part of turbulence generation ridges according to Embodiment 1 (an enlarged side-elevation view of FIG. 3). FIG. 5 is a diagram describing one of the turbulence generation ridges according to Embodiment 1. FIG. 6 is a perspective view illustrating the turbulence generation ridges according to Embodiment 1.

As FIGS. 1 to 6 show, each of the turbulence generation ridges 13 has a substantially quadrilateral cross section taken in a direction substantially orthogonal to the direction in which the turbulence generation ridge 13 extends (i.e., substantially orthogonal to the substantially tire-radial direction). The inner end portion 13A and the outer end portion 13B are formed so as to be smoothly continuous to the corresponding surfaces of the protrusions 15, the inner end portion 13A located at the innermost position in the tire-radial direction of each turbulence generation ridge 13, the outer end portion 13B located at the outermost position in the tire-radial direction of each turbulence generation ridge 13.

Specifically, the inner end portions 13A are smoothly continuous to the surfaces of the corresponding rim guards 15A (inner-side restriction members). The outer end portions 13B are smoothly continuous to the surfaces of the corresponding protectors 15B (outer-side restriction members).

The height of each inner end portion 13A from the surface 7a of the corresponding tire side portion 7 is referred to as the inner end height (H1) whereas the height of each outer end portion 13B from the surface 7a of the corresponding tire side portion 7 is referred to as the outer end height (H2). As FIG. 5 shows, the inner end height (H1) is larger than the outer end height (H2). The above-mentioned surface 7a of each tire side portion 7 refers to the surface (indicated by the line SL) on which no ridges 15 (i.e., the rim guard 15A and the protector) are formed.

In the case where the inner end height (H1) is smaller than the outer end height (H2), the following phenomenon can be observed unlike in a case where the inner end height (H1) is higher than the outer end height (H2). The rotation of the pneumatic tire and the travelling of the vehicle generate a centrifugal force that makes air flow from the inner side in the tire-radial direction to the outer side in the tire-radial direction. In this case, sufficient acceleration of the air which flows over and beyond the turbulence generation ridges cannot be obtained.

In FIG. 6, "h" denotes the ridge height, which is the height measured from the surface 7a of the tire side portion 7 to the most protruding position of the turbulence generation ridge 13 located in the central portion in the longitudinal direction thereof. The ridge width "w" is the width of each tire side portion 7 measured in the direction that is substantially orthogonal to the longitudinal direction thereof. In addition, the pitch "p" represents the distance between each adjacent two of the turbulence generation ridges. With these "h," "w," and "p" defined as above, it is preferable that relationships $1.0 \leq p/h \leq 50.0$ and $1.0 \leq (p-w)/w \leq 100.0$ are satisfied. In particular, it is more preferable that relationship $2.0 \leq p/h \leq 24.0$ is satisfied. It is even more preferable that relationship $10.0 \leq p/h \leq 20.0$ is satisfied and that relationship $4.0 \leq (p-w)/w \leq 39.0$ is satisfied.

The air flow (turbulence) depends on the above-mentioned ratio p/h. If the pitch (p) is too short, that is, if the pitch (p) is narrowed, the air flow does not enter the bottom portion of the groove. In contrast, if the pitch (p) is too wide, the result will be the same as in a case where no such shapes as the turbulence generation ridges 13 are formed. Accordingly, it is preferable to set the ratio p/h within the above-mentioned ranges.

The ratio (p−w)/w is the ratio of the width of the protruding portion to the pitch (p). Too small a ratio (p−w)/w is equivalent to equalizing the proportion of the surface areas of the turbulence generation ridges 13 to the area of the surface that is the target for the improved heat dissipation. The turbulence generation ridges 13 are made of rubber, so no great effect to improve heat dissipation can be expected by increasing the surface areas. Accordingly, the minimum value of the ratio (p−w)/w is set at 1.0.

The angle (θ) made by each turbulence generation ridge 13 with respect to the tire-radial direction is preferably within a range $-70° \leq \theta \leq 70°$ (see FIG. 4). The pneumatic tire 1 is a rotating body, so that the flows of the air flowing over the surfaces 7a of the tire side portions 7 are directed outwards in the tire-radial direction by the centrifugal force. Specifically, of all the entering air, the part stagnating at the back side of each turbulence generation ridge 13 should be reduced for the purpose of improving the cooling effect. To this end, the angle (θ) made by each turbulence generation ridge 13 with respect to the tire-radial direction is preferably within the above-mentioned range.

The angle (θ) made by each turbulence generation ridge 13 with respect to the tire-radial direction may vary from one turbulence generation ridge 13 to another because the speed of the air flow varies, though slightly, depending upon the position, in the tire-radial direction, of each turbulence generation ridge 13 within the pneumatic tire as the rotating body.

In addition, each of the turbulence generation ridges 13 may be subdivided into plural, discontinuous portions arranged in the direction in which the turbulence generation ridge 13 extends. Moreover, the turbulence generation ridges 13 may be arranged not uniformly in the tire-circumferential direction. When the air flows over the turbulence generation ridges 13 formed on the surfaces 7a of the tire side portions 7, the air stagnates at the rear side, the back-surface side), in the tire-rotation direction, of each turbulence generation ridge 13. The stagnated air flow, if occurs, lowers the cooling effect on some portions than that on portions where no turbulence generation ridges 13 are formed. In order to improve the average heat transfer rate through reduction of such portions with lowered cooling effect, an effective means is subdividing each of the turbulence generation ridges 13 into discontinuous portions arranged in the extending direction.

Advantageous Effects of Embodiment 1

Figure 7:
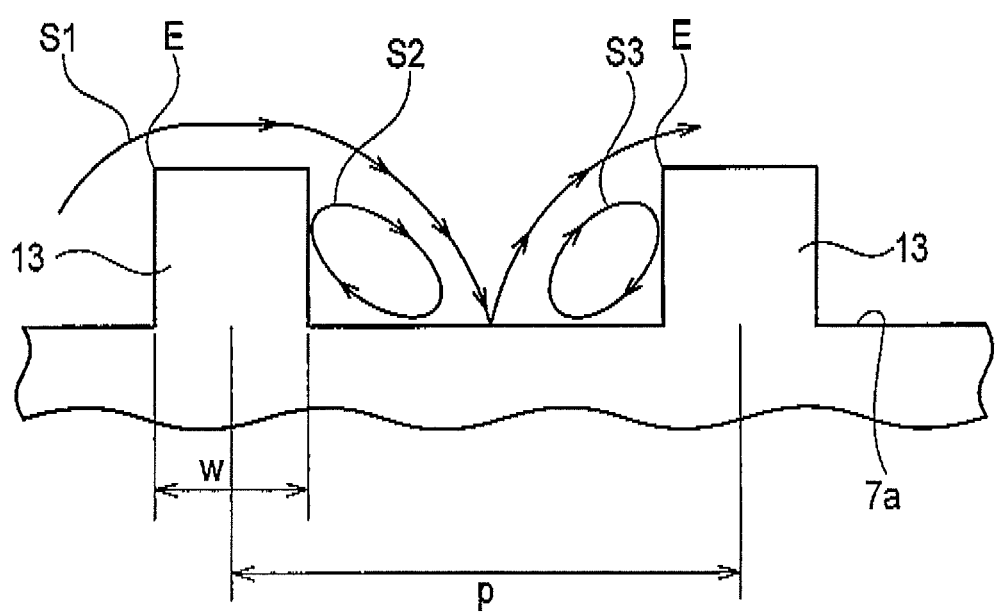
FIG. 7 is a diagram explaining some advantageous effects of the turbulence generation ridges according to Embodiment 1.

According to the pneumatic tire 1 of Embodiment 1 described thus far, as FIG. 7 shows, along with the rolling of the pneumatic tire 1, a flow of the air (hereafter, referred to as the "main flow S1") that has been in contact with a surface 7a (sidewall portion) of the tire side portion 7 is separated from the surface 7a of the tire side portion 3 by one of the turbulence generation ridges 13. The main flow S1 then goes over and beyond a front-side edge E of the turbulence generation ridge 13, and accelerates towards the rear side (i.e., towards back-surface side) in the tire-rotation direction.

At this time, as the inner end height (H1) is larger than the outer end height (H2) the centrifugal force caused by the rotation of the pneumatic tire 1 and by the travelling of the vehicle further accelerates the air that flows from the inner side in the tire-radial direction towards the outer side in the tire-radial direction, or the main flow S1 that goes over and beyond the turbulence generation ridge 13. What can be obtained accordingly is higher cooling effect on the temperature of the tire side portion 7.

The accelerated main flow S1 then flows in a substantially orthogonal direction to the surface 7a of the tire side portion 7 in the back-surface side of the turbulence generation ridge 13. At this time, the air S2 flowing in a portion (region) where the air flow stagnates takes away the heat that is retained at the back-surface side of the turbulence generation ridge 13, and then joins again the main flow S1. The resultant main flow S1 goes over and beyond a front-side edge E of the next turbulence generation ridge 13, and accelerates.

Further, in a portion (region) located at the front side (front-surface side) of the next turbulence generation ridge 13 in the tire-rotation direction, the main flow S1 stagnates. The air S3 that flows in the portion (region) takes away the heat that is retained at the front-surface side of the turbulence generation ridge 13. Then, the air S3 joins again the main flow S1.

In summary, the main flow S1 goes over and beyond the front-side edges E and accelerates while the air S2 and S3 takes away the heat and loins again the main flow S1. Thus, the reduction of tire temperature can be achieved in the wide range. In particular, the temperature reduction can be achieved at the base portions of the turbulence generation ridges 13 and the regions that the main flow S1 comes into contact with in the substantially perpendicular direction.

In addition, as the inner-side end portions 13A and the outer-side end portions 13B are smoothly continuous to the surfaces of the protrusions 15 (i.e., the rim guards 15A and the protectors 15B), the turbulence generation ridges 13 are do not protrude from the corresponding tire side portions 7, and are thus not exposed outside. Accordingly, the occurrence of the bare during the manufacture can be reduced. Consequently, defects in shape or in appearances can be made less likely.

Incidentally, even if one of the turbulence generation ridges 13 comes into contact with something (e.g., a curb), a stress which acts on the base (bottom portion), which may become the starting point of the breakage, of the turbulence generation ridge 13 can be kept to a small degree. Accordingly, the stiffness of the inner-side end portions 13A and of the outer-side end portions 13B can be enhanced. Consequently, while the vehicle is running, the damages such as the chipping and the tearing-away of the turbulence generation ridges 13 can be reduced.

Incidentally, the centrifugal force caused by the rotation of the pneumatic tire 1 and by the travelling of the vehicle makes the air flow from the inner side in the tire-radial direction towards the outer side in the tire-radial direction. As the inner end height (H1) is larger than the outer end height (H2), the air that flows in the above-described direction, that is, the air that goes over and beyond the turbulence generation ridges can accelerate. The accelerated air can enhance the cooling effect on the temperatures of the tire side portions.

The temperatures of the portions including the side-reinforcement layers 9 is supposed to rise significantly by such factors as deflection (e.g., the portions located on the outer sides of the side-reinforcement layers of a flat tire). The turbulence generation ridges 13, which are formed in the entire areas of the tire side portions 7 allow the temperatures of the portions to be lowered efficiently. Accordingly, the durability of the pneumatic tire 1 itself can be improved.

As has been described thus far, according to the pneumatic tire 1 of Embodiment 1, the occurrence of defects in shape or in appearances during the manufacture can be reduced, the breaking of turbulence generation ridges can be prevented from occurring while the vehicle is running, and the cooling effect on the temperatures of the tire side portions 7 can be enhanced.

Embodiment 2

Next, the configuration of turbulence generation ridges 13 formed on a pneumatic tire 1 according to Embodiment 2 will be described by referring to FIGS. 8 and 9. Note that the same portions as those of the pneumatic tire 1 of Embodiment 1 are denoted by the same reference numerals. The following description focuses mainly on the portions that are different from Embodiment 1.

Figure 8:
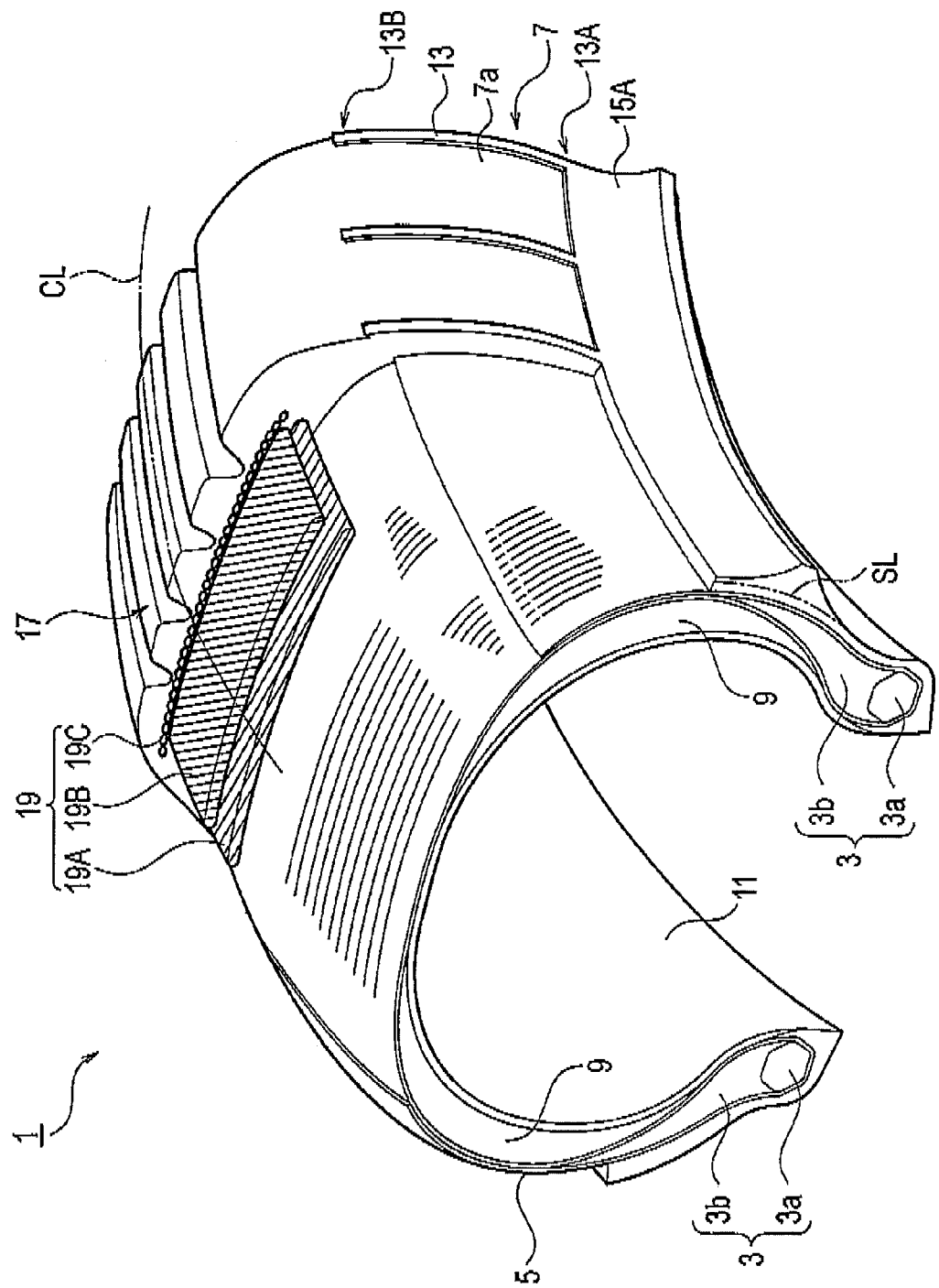
FIG. 8 is a partially-sectional perspective view illustrating a pneumatic tire according to Embodiment 2.

FIG. 8 is a partially-sectional perspective view illustrating the pneumatic tire according to Embodiment 2. FIG. 9 is a side-elevation view illustrating a part of turbulence generation ridges according to Embodiment 2. Note that the pneumatic tire 1 of Embodiment 2 is not provided with protectors 15B (outer-side restriction members) located on the sides of the tread-shoulder portions.

As FIGS. 8 and 9 show, an inner end portion 13A of each turbulence generation ridge 13 is smoothly continuous to the surface of a protrusion 15. To put it differently, each inner end portion 13A is smoothly continuous to the surface of a rim guard 15A (inner-side restriction member).

Also in this case, the inner end height (H1) is preferably larger than the outer end height (H2). In addition, when "h" denotes the ridge height, "w" denotes the ridge width, and "p" represents the distance between each adjacent two of the turbulence generation ridges, it is preferable that relationships $1.0 \leq p/h \leq 50.0$ and $1.0 \leq (p-w)/w \leq 100.0$ are satisfied. In particular, it is more preferable that relationship $2.0 \leq p/h \leq 24.0$ is satisfied. It is even more preferable that relationship $10.0 \leq p/h \leq 20.0$ is satisfied. At the same time, it is more preferable that relationship $4.0 \leq (p-w)/w \leq 39.0$ is satisfied.

In addition, the angle (θ) made by each turbulence generation ridge 13 with respect to the tire-radial direction is preferably within a range −70°≦θ≦70°.

Advantageous Effects of Embodiment 2

According to the pneumatic tire 1 of Embodiment 2 described thus far, besides the enhancement of the cooling effect on the temperatures of the tire side portions 7, the following effect can be obtained. As the inner end portions 13A are smoothly continuous to the surfaces of the corresponding ridges 15 (rim guards 15A), the inner end portions 13A are do not protrude from the corresponding tire side portions 7, and are thus not exposed outside. Accordingly, the occurrence of the bare in the inner end portions 13A during the manufacture can be reduced. Consequently, defects in shape or in appearances can be made less likely.

Incidentally, even if one of the turbulence generation ridges 13 comes into contact with something (e.g., a curb), a stress which acts on the base (bottom portion), which may become the starting point of the breakage, of the turbulence generation ridge 13 can be kept, to a small degree. Accordingly, the stiffness of the turbulence generation ridges 13 can be enhanced. Consequently, while the vehicle is running, the damages such as the chipping and the tearing-away of the turbulence generation ridges 13 can be reduced.

Embodiment 3

Next, the configuration of turbulence generation ridges 13 formed on a pneumatic tire 1 according to Embodiment 3 will be described by referring to FIGS. 10 and 11. Note that the same portions as those of the pneumatic tire 1 of Embodiment 1 or 2 are denoted by the same reference numerals. The following description focuses mainly on the portions that are different from Embodiment 1 or 2.

FIG. 10 is a partially-sectional perspective view illustrating the pneumatic tire according to Embodiment 3. FIG. 11 is a side-elevation view illustrating a part of turbulence generation ridges according to Embodiment 3. Note that the pneumatic tire 1 of Embodiment 3 is not provided with rim guards 15A (inner-side restriction members) located on the outer sides, in the tread-width direction, of the bead portions 3, the bead portions 3 located on the inner sides, in the tire-radial direction, within the tire side portions 7.

As FIGS. 10 and 11 show, an outer end portion 13B of each turbulence generation ridge 13 is smoothly continuous to the surface of a protrusion 15. To put it differently, each outer end portion 13B is smoothly continuous to the surface of a protector 15B (outer-side restriction member).

Also in this case, the inner end height (H1) is preferably larger than the outer end height (H2). In addition, when "h" denotes the ridge height, "w" denotes the ridge width, and "p" represents the distance between each adjacent two of the turbulence generation ridges, it is preferable that relationships 1.0≦p/h≦50.0 and 1.0≦(p−w)/w≦100.0 are satisfied. In particular, it is more preferable that relationship 2.0≦p/h≦24.0 is satisfied. It is even more preferable that relationship 10.0≦p/h≦20.0 is satisfied and that relationship 4.0≦(p−w)/w≦39.0 is satisfied. In addition, the angle (θ) made by each turbulence generation ridge 13 with respect to the tire-radial direction is preferably within a range −70°≦θ≦70°.

Advantageous Effects of Embodiment 3

According to the pneumatic tire 1 of Embodiment 3 described thus far, besides the enhancement of the cooling effect on the temperatures of the tire side portions 7, the following effect can be obtained. As the outer end portions 133 are smoothly continuous to the surfaces of the corresponding protrusions 15 (protectors 15B), the outer end portions 13B do not protrude from the corresponding tire side portions 7, and are thus not exposed outside. Accordingly, the occurrence of the bare in the outer end portions 13B during the manufacture can be reduced. Consequently, defects in shape or in appearances can be made less likely.

Incidentally, even if one of the turbulence generation ridges 13 comes into contact with something (e.g., a curb), a stress which acts on the base (bottom portion), which may become the starting point of the breakage, of the turbulence generation ridge 13 can be kept to a small degree. Accordingly, the stiffness of the turbulence generation ridges 13 can be enhanced. For example, even in a case where while the vehicle is negotiating a sharp curve and a large lateral force is acting on the pneumatic tire 1, the outer end portions 133 do not come into direct contact with the road surface. Consequently, while the vehicle is running, the damages such as the chipping and the tearing-away of the turbulence generation ridges 13 can be reduced.

[Modified Examples of Turbulence Generation Ridges]

In the foregoing descriptions of Embodiments 1 to 3, each turbulence generation ridge 13 has a substantially quadrilateral cross section when sectioned substantially orthogonal to the extending direction (i.e., orthogonal to substantially tire-radial direction). It is, however, possible to make the following modifications.

Modified Example 1

Firstly, a turbulence generation ridge 13 of Modified Example 1 will be described by referring to FIG. 12. FIG. 12 shows sectional diagrams of ridges each illustrating a section of the turbulence generation ridge 13 of Modified Example 1 substantially orthogonal to the extending direction.

Figure 12A:
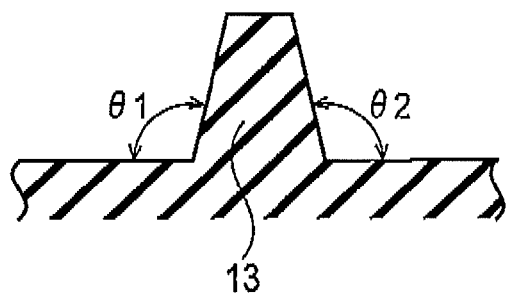
FIG. 12 shows sectional views each illustrating a section of one of the turbulence generation ridges taken in a substantially-orthogonal direction to the extending direction according to Modified Example 1.
Figure 12B:
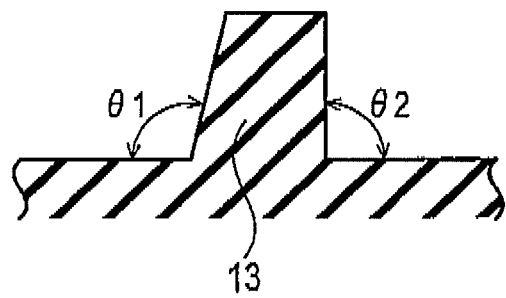
Figure 12C:
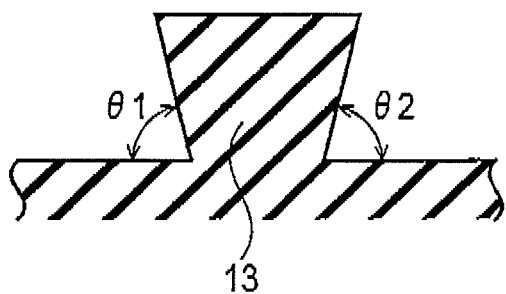

As FIGS. 12(a) to 12(c) show, each turbulence generation ridge 13 has a substantially trapezoidal cross section when sectioned substantially orthogonal to the extending direction (i.e., orthogonal to substantially tire-radial direction).

In each of these sectional shapes, the sloping angle (θ1) made by one of the sidewalls of the turbulence generation ridge 13 and the surface 7a of the corresponding tire side portion 7 does not have to be equal to the sloping angle (θ2) made by the other sidewalls of the turbulence generation ridge 13 and the surface 7a of the corresponding tire side portion 7.

Modified Example 2

Next, a turbulence generation ridge 13 of Modified Example 2 will be described by referring to FIG. 13. FIG. 13 shows sectional diagrams of ridges each illustrating a section of the turbulence generation ridge 13 of Modified Example 2 substantially orthogonal to the extending direction.

Figure 13A:
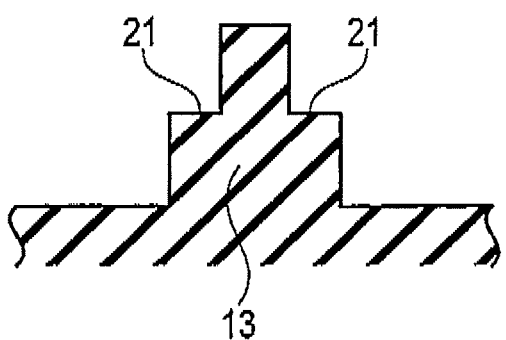
FIG. 13 shows sectional views each illustrating a section of one of the turbulence generation ridges taken in a substantially-orthogonal direction to the extending direction according to Modified Example 2.
Figure 13B:
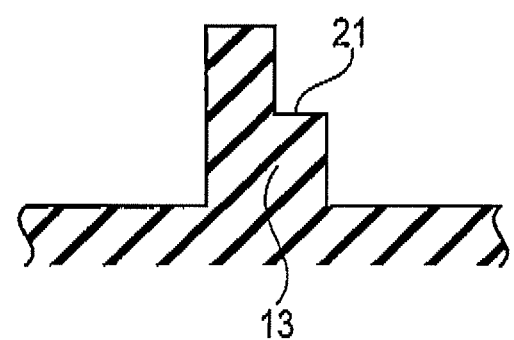

As FIGS. 13(a) and 13(b) show, each turbulence generation ridge 13 has a step-like shape having a step 21 in a section substantially orthogonal to the extending direction (i.e., orthogonal to substantially tire-radial direction). Each turbulence generation ridge 13 may have steps 21 formed respectively in the both sidewalls thereof as shown in FIG. 13(a). Alternatively, each turbulence generation ridge 13 may have only one step 21 formed in one of the sidewalls thereof as shown in FIG. 13(b).

In each of these sectional shapes, the sloping angle (θ1) made by one of the sidewalls of the turbulence generation ridge 13 and the surface 7a of the corresponding tire side portion 7 and the sloping angle (θ2) made by the other sidewalls of the turbulence generation ridge 13 and the surface 7a of the corresponding tire side portion 7 do not have to be right angles or do not have to be equal to each other. In addition, the intersecting angle (θ3) between one of the surfaces of each step and the other surfaces thereof does not have to be substantially right angle. Needless to say, the intersecting angle (θ3) may be an oblique angle.

Modified Example 3

Next, a turbulence generation ridge 13 of Modified Example 3 will be described by referring to FIG. 14. FIG. 14 shows sectional diagrams of ridges each illustrating a section of the turbulence generation ridge 13 of Modified Example 3 substantially orthogonal to the extending direction.

Figure 14A:
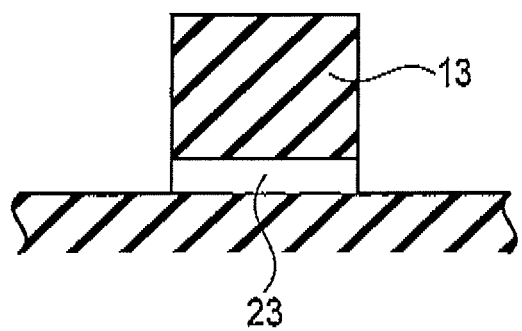
FIG. 14 shows sectional views each illustrating a section of one of the turbulence generation ridges taken in a substantially-orthogonal direction to the extending direction according to Modified Example 3.
Figure 14B:
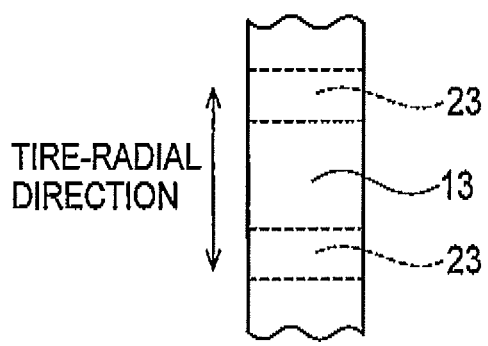

As FIGS. 14(a) and 14(b) show, each turbulence generation ridge 13 has a substantially quadrilateral cross section when sectioned substantially orthogonal to the extending direction (i.e., orthogonal to substantially tire-radial direction).

For the purpose of enhancing the cooling rate of the turbulence generation ridge 13 itself, through-holes 23 are formed in each turbulence generation ridge 13. Each through-hole 23 penetrates the turbulence generation ridge 13 in a direction substantially orthogonal to the extending direction (i.e., substantially in the tire-radial direction). The through-holes 23 are arranged in the tire-radial direction at intervals.

Figure 14C:
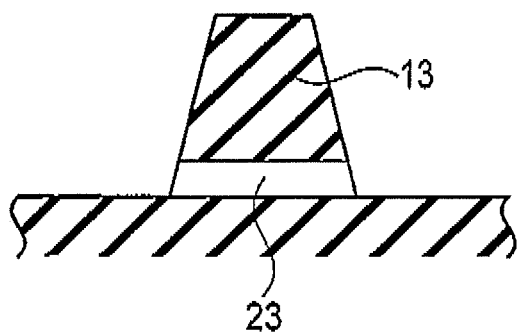
Figure 14D:
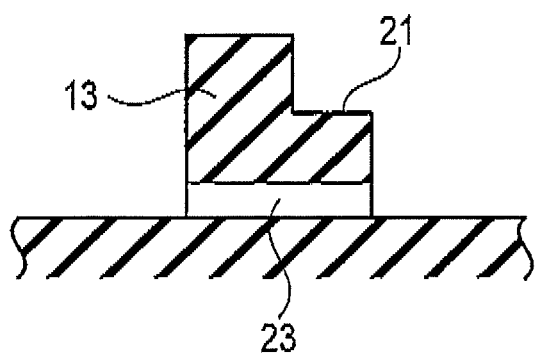

Note that each turbulence generation ridge 13 with such through-holes 23 formed therein does not have to have a substantially quadrilateral cross section when sectioned substantially orthogonal to the extending direction. For example, the cross section may have a substantially trapezoidal shape as shown in FIG. 14(c) or a step-like shape with a step 21 as shown in FIG. 14(d).

Other Embodiments

In the foregoing description, the content of the invention has been disclosed using some embodiments of the invention. The description and the drawings of the above-described embodiments are parts of the disclosure, but are not understood to limit the invention.

Specifically, the pneumatic tire 1 in the foregoing description includes the side-reinforcement layers 9 (this means that the pneumatic tire 1 is a run-flat tire), but this is not the only possible example. Instead, the pneumatic tire 1 may be a tire without any side-reinforcement layers 9 (e.g., an off-the-road radial tire (ORR) or a truck-bus radial tire (TBR)).

In addition, the turbulence generation ridges 13 in the foregoing description are formed in the entire tire's side portions 7, but this is not the only case. Needless to say, for example, the turbulence generation ridges 13 may be formed at positions of tire maximum width in a tread-width-direction section. Alternatively, the turbulence generation ridges 13 may be formed at positions at the outer-sides, in the tire-radial direction, of the bead fillers 3b.

Those skilled in the art will conceive of various alternative embodiments, examples, and application techniques. Accordingly, the technical scope of the invention should be determined by the features to specify the invention described in the scope of claims and relevant to the foregoing description.

Example Cases

For the purpose of showing the effects of the invention more clearly, description will be given below of the results of testing conducted using pneumatic tires of Comparative Examples 1 and 2 and of Examples 1 and 2 specified below. Note that these examples do not limit the invention at all.

The data for each pneumatic tire were measured under the following conditions.
Tire Size: 285/50R20
Wheel Size: 8JJ×20
Internal Pressure Condition: 0 kPa (flat state)
Load Condition: 9.8 kN
Speed Condition: 90 km/h
The configurations of the pneumatic tires and the testing results (on durability and frequency of bare occurrence) will be described by referring to Table 1.

TABLE 1

|  | Comparative Example 1 | Comparative Example 2 | Example 1 | Example 2 |
|---|---|---|---|---|
| Rim Guard | — | None | None | Provided (Continuous to Inner-Side End Portion) |
| Protector | — | None | Provided (Continuous to Outer-Side End Portion) | Provided (Continuous to Outer-Side End Portion) |
| Change in Ridge Height | — | None | Exist (Inside < Outside) | Exist (Inside < Outside) |
| Length of Ridge in Extending Direction | — | 54 mm | 54 mm | 54 mm |
| Height of Ridge Center (h) | — | 2 mm | 2 mm | 2 mm |
| p/h | — | 12 | 12 | 12 |
| Width of Ridge (w) | — | 2 mm | 2 mm | 2 mm |
| Durability | 100 | 140 | 140 | 140 |
| Frequency of Bare (Defect) Occurrence | None | Large | Small | Small |

As Table 1 shows, the pneumatic tire of Comparative Example 1 had no turbulence generation ridges formed therein. The pneumatic tires of Comparative Example 2 and of Examples 1 and 2 had corresponding turbulence generation ridges formed therein, the turbulence generation ridges specified in Table 1.
<Durability>

Each pneumatic tire was mounted on the testing drum, and the duration mileage until failure of the pneumatic tire took place is expressed by an index. A pneumatic tire that has a greater index is more excellent in durability.

The results show that the pneumatic tires of Examples 1 and 2 had higher cooling effects on the temperatures of the tire side portions and higher durability of pneumatic tires than the pneumatic tire of Comparative Example 1.

Figure 15:
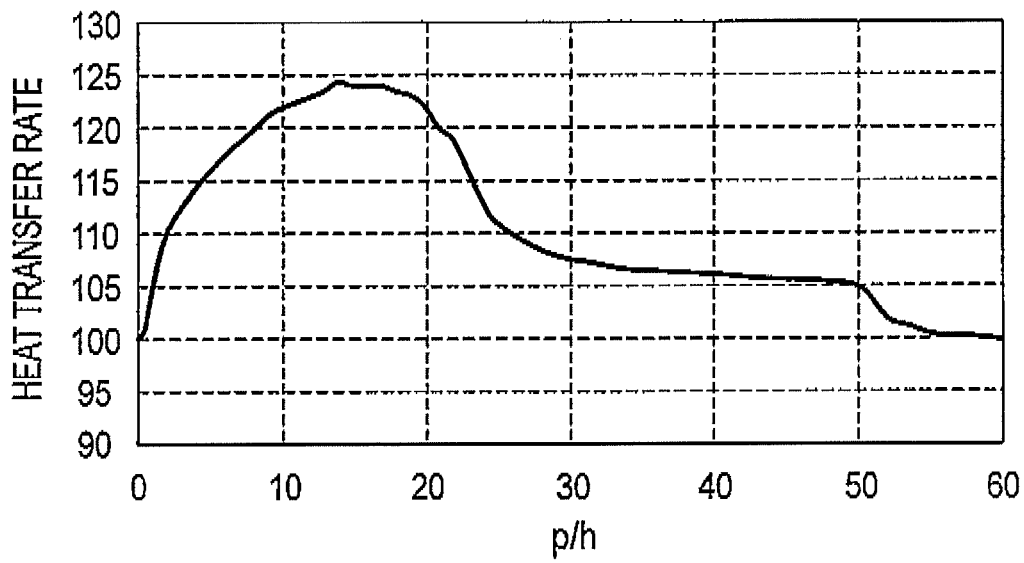
FIG. 15 is a graph illustrating the heat-transfer rate of pneumatic tires of Examples (Part 1).
Figure 16:
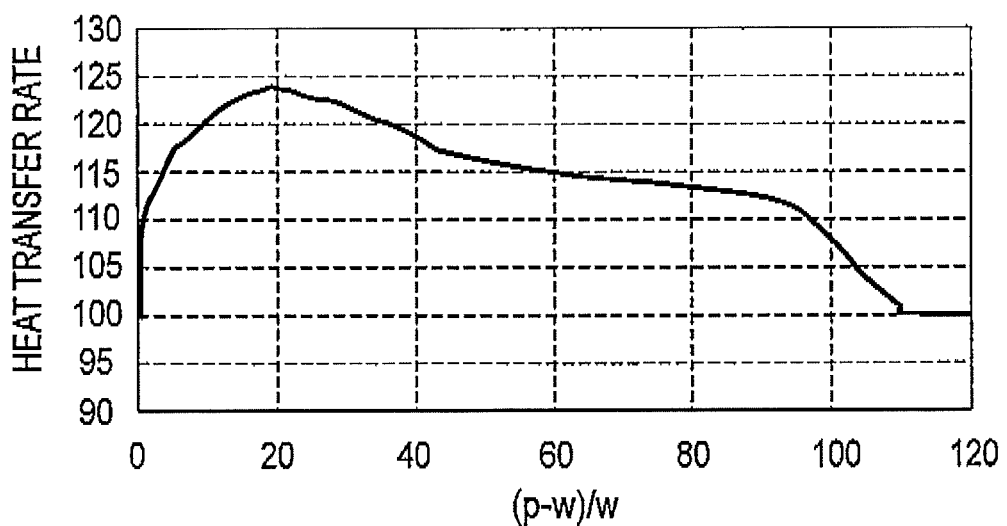
FIG. 16 is a graph illustrating the heat-transfer rate of pneumatic tires of Examples (Part 2)

Durability testing was conducted on pneumatic tires having different ratios of p/h and (p−w)/w of each turbulence generation ridge. The results are shown in FIGS. 15 and 16. In each of FIGS. 15 to 17, the vertical axis of the graph represents the heat-transfer rate obtained in the following procedure. A certain constant voltage was applied to a heater to generate a certain amount of heat. The heat was then sent to the pneumatic tire by an air blower. The temperature of the tire surface and the speed of air flow were measured to obtain the heat-transfer rate. A larger heat-transfer rate means higher cooling effect and higher durability. In each graph, the value 100 is the heat-transfer rate of the pneumatic tire without any turbulence generation ridges formed therein (i.e., pneumatic tire of Comparative Example 1).

The measurement testing of heat-transfer rate was conducted under the following conditions.

Tire Size: 285/50R20
Wheel Size: 8JJ×20
Internal Pressure Condition: 0 kPa (flat state)
Load Condition: 0.5 kN
Speed Condition: 90 km/h FIG. 15 shows the relationship between the durability performance and the ratio (p/h) of the pitch (p) for the turbulence generation ridges and the height (h) of each turbulence generation ridge. A ratio p/h within a range $1.0 \leqq p/h \leqq 50.0$ resulted in a higher heat-transfer rate. An even higher heat-transfer rate and higher durability were obtained by setting the ratio p/h within a range from 2.0 to 24.0. It turns out that the ratio p/h for each turbulence generation ridge should be within a range $1.0 \leqq p/h \leqq 50.0$, in particular, preferably within a range $2.0 \leqq p/h \leqq 24.0$, and more preferably within a range $10.0 \leqq p/h \leqq 20.0$.

FIG. 16 shows the relationship between the heat-transfer rate (measured by the same method as above) and the ratio (p−w)/w. It turns out that the ratio (p−w)/w is preferably set within a range $1.0 \leqq (p-w)/w \leqq 100.0$, and particularly within a range $4.0 \leqq (p-w)/w \leqq 39.0$.

Figure 17:
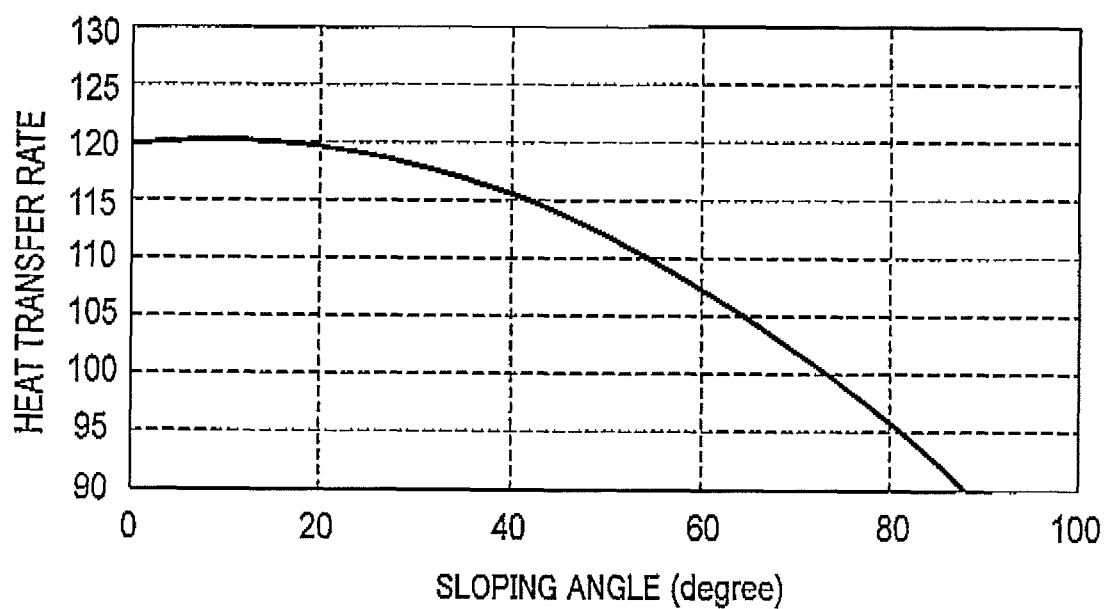
FIG. 17 is a graph illustrating the heat-transfer rate of pneumatic tires of Examples (Part 3).

As FIG. 17 shows, the angle (θ) made by each turbulence generation ridge 13 with respect to the tire-radial direction is preferably within a range from 0° to 70°. Note that it is expected that if the angle (θ) made by each turbulence generation ridge 13 with respect to the tire-radial direction is within a range from 0° to −70°, similar heat-transfer rate can be obtained.
<Frequency of Bare Occurrence>

During the manufacture of pneumatic tires, the frequency of bare occurrence at the time of manufacturing a predetermined number of pneumatic tires was measured. A smaller frequency of bare occurrence means a smaller possibility of occurrence of defects in shape or in appearances.

The result of this measurement revealed that the pneumatic tire of each of Examples 1 and 2 had a smaller frequency of bare occurrence and a smaller possibility of occurrence of defects in shape or in appearances than the pneumatic tire of Comparative Example 2 did.

INDUSTRIAL APPLICABILITY

As has been described thus far, the pneumatic tire 1 according to the invention less likely has defects in shape or in appearances during the manufacture. In addition, while the vehicle is running, the turbulence generation ridges can be prevented from being broken. Moreover, the cooling effect on the temperatures of the tire side portions 7 can be enhanced. Accordingly, the invention is useful as a technique for manufacturing the pneumatic tire 1.

The invention claimed is:

1. A pneumatic tire comprising a plurality of turbulence generation ridges which extend on a surface of a tire side portion in a tire-radial direction and which are arranged at a pitch in a tire-circumferential direction,
    wherein a protrusion rising from the surface of the tire side portion is formed in the tire side portion,
    at least one of an inner end portion located on the innermost side, in the tire-radial direction, of each turbulence generation ridge and an outer end portion located on the outermost side, in the tire-radial direction, of each turbulence generation ridge is smoothly continuous to a surface of the protrusion, and
    an inner end height (H1), which is a height of the inner end portion from the surface of the tire side portion, is larger than an outer end height (H2), which is a height of the outer end portion from the surface of the tire side portion,
    and wherein adjacent ones of said ridges are separated by regions of said tire side portion that are exposed to the environment, said regions having a circumferential and radial dimension.

2. The pneumatic tire according to claim 1 wherein the protrusion is any one of an inner-side restriction member and an outer-side restriction member,
    the inner-side restriction member being formed at the outer side, in a tread-width direction, of a bead portion located at the inner side in the tire-radial direction within the tire side portion, the inner-side restriction member preventing the inner end portion from being damaged,
    the outer-side restriction member being formed in a tread-shoulder portion and preventing the outer end portion from being damaged.

3. The pneumatic tire according to claim 1 wherein the turbulence generation ridges are formed at any one of a tire maximum width position in a tread-width-direction section and a position located at the outer side, in the tire-radial direction, of a bead filler.

4. The pneumatic tire according to claim 1 wherein relationships $1.0<p/h<50.0$ and $1.0<(p-w)/w<100.0$ are satisfied where "h" is a ridge height, which is a height from the surface of the tire side portion to a protruding position located in the center of each turbulence generation ridge in a longitudinal direction of the turbulence generation ridge,
    each turbulence generation ridge protruding most at the protruding position, "w" is a ridge width, which is a width extending substantially orthogonal to the longitudinal direction of the turbulence generation ridge, and
    "p" is a pitch between each adjacent two of the turbulence generation ridges.

5. The pneumatic tire according to claim 1 further comprising a side reinforcement layer which has a crescent-like shape in a tread-width-direction section and which is configured to reinforce the tire side portion.

\* \* \* \* \*